(12) United States Patent
Zhang et al.

(10) Patent No.: US 8,582,910 B2
(45) Date of Patent: Nov. 12, 2013

(54) METHODS AND APPARATUS FOR EDITING IMAGES

(75) Inventors: Wei Zhang, Hong Kong (CN); Wai Kuen Cham, Hong Kong (CN)

(73) Assignee: The Chinese University of Hong Kong, Hong Kong (HK)

( * ) Notice: Subject to any disclaimer, the term of this patent is extended or adjusted under 35 U.S.C. 154(b) by 469 days.

(21) Appl. No.: 12/896,546

(22) Filed: Oct. 1, 2010

(65) Prior Publication Data

US 2011/0085741 A1 Apr. 14, 2011

Related U.S. Application Data

(60) Provisional application No. 61/278,182, filed on Oct. 2, 2009.

(51) Int. Cl.
*G06K 9/40* (2006.01)

(52) U.S. Cl.
USPC .......................................... 382/255; 382/266

(58) Field of Classification Search
USPC ............................ 382/255, 254, 266, 274, 279
See application file for complete search history.

(56) References Cited

U.S. PATENT DOCUMENTS

| | | | |
|---|---|---|---|
| 7,463,296 B2 | 12/2008 | Sun et al. | |
| 8,159,552 B2 | 4/2012 | Lim et al. | |
| 2006/0008141 A1* | 1/2006 | Lin et al. | 382/167 |
| 2007/0280593 A1* | 12/2007 | Brychell et al. | 385/31 |
| 2008/0131019 A1 | 6/2008 | Ng | |

FOREIGN PATENT DOCUMENTS

| | | |
|---|---|---|
| JP | 2005295567 A | 10/2005 |
| JP | 2008015754 A | 1/2008 |
| JP | 2009070384 A | 4/2009 |
| JP | 2009163642 A | 7/2009 |
| JP | 2009182576 A | 8/2009 |
| WO | 02/39059 A1 | 5/2002 |

OTHER PUBLICATIONS

Bae et al., "Defocus Magnification," *Eurographics* 26(3):9 Pages, 2007.
Bando et al., "Towards Digital Refocusing from a Single Photograph," in *Proceedings of the 15th Pacific Conference on Computer Graphics and Applications*, Pacific Graphics 2007, Maui, HI, Oct. 29-Nov. 2, 2007, pp. 363-372.
Canny, "A Computational Approach to Edge Detection," *IEEE Transactions on Pattern Analysis and Machine Intelligence* PAMI—8(6):679-698, 1986.
Chan et al., "Total Variation Blind Deconvolution," *IEEE Transactions on Image Processing* 7(3):370-375, 1998.

(Continued)

*Primary Examiner* — Yon Couso
(74) *Attorney, Agent, or Firm* — Seed IP Law Group PLLC (57) ABSTRACT

Methods and apparatus for editing an image having focused and defocused objects are provided in the present application. According to an embodiment, the method comprises: determining blurriness of edge pixels in the image; propagating the determined blurriness to non-edge pixels adjacent to each of the edge pixels so as to determine blurriness of the non-edge pixels; estimating a focus map based on the blurriness of the edge pixels and the non-edge pixels to identify the defocused objects and the focused objects; and refocusing the defocused objects based on the focus map or defocusing at least one of the defocused objects and the focused objects.

36 Claims, 6 Drawing Sheets

(56) References Cited

OTHER PUBLICATIONS

Eisemann et al., "Flash Photography Enhancement via Intrinsic Relighting," in *Proceedings of SIGGRAPH 2004, the 31st International Conference on Computer Graphics and Interactive Techniques*, ACM SIGGRAPH, Los Angeles, CA, Aug. 8-Aug. 12, 2004, 83 Pages.

Fan et al., "Model-Based Edge Reconstruction for Low Bit-Rate Wavelet-Compressed Images," *IEEE Transactions on Circuits and Systems for Video Technology* 10(1):120-132, 2000.

Favaro et al., "A Geometric Approach to Shape from Defocus," *IEEE Transactions on Pattern Analysis and Machine Intelligence* 27(3):406-417, 2005.

Fergus et al., "Removing Camera Shake from a Single Photograph," *ACM Transactions on Graphics* 25(3):787-794, 2006.

Hasinoff et al., "A Layer-Based Restoration Framework for Variable-Aperture Photography," *IEEE 11th International Conference on Computer Vision*:8 Pages, 2007.

Hasinoff et al., "Light-Efficient Photography," *IEEE Transactions on Pattern Analysis and Machine Intelligence*, pp. 1-14, 2011.

Joshi et al., "PSF Estimation using Sharp Edge Prediction," *IEEE Conference on Computer Vision and Pattern Recognition*,8 Pages, 2008.

Kim et al., "An Interior-Point Method for Large-Scale $\lambda_1$-Regularized Least Squares," *IEEE Journal of Selected Topics in Signal Processing* 1(4):606-617, 2007.

Kubota et al., "Reconstructing Arbitrarily Focused Images From Two Differently Focused Images Using Linear Filters," *IEEE Transactions on Image Processing* 14(11):1848-1859, 2005.

Levin et al., "Colorization using Optimization," *ACM Transactions on Graphics* 23(3):6 Pages, 2004.

Levin et al., "Image and depth from a conventional camera with a coded aperture," in *Proceedings of SIGGRAPH 2007, the 34th International Conference and Exhibition on Computer Graphics and Interactive Techniques*, ACM SIGGRAPH, San Diego, CA, Aug. 5-Aug. 9, 2007, 34 Pages.

Liang et al., "Programmable Aperture Photography: Multiplexed Light Field Acquisition," *ACM Transactions on Graphics* 27(3):1-10, 2008.

Lin et al., "Depth from motion and defocus blur," *Optical Engineering* 45(12):12 Pages, 2006.

Moreno-Noguer et al., "Active Refocusing of Images and Videos," *ACM Transactions on Graphics* 26(3):9 Pages, 2007.

Nagahara et al., "Flexible Depth of Field Photography," *IEEE Transactions on Pattern Analysis and Machine Intelligence* 33(1):58-71, 2011.

Ng et al., "Light Field Photography with a Hand-held Plenoptic Camera," *Stanford Tech Report CTSR 2005-02*, 1-11, 2005.

Petschnigg et al., "Digital Photography with Flash and No-Flash Image Pairs," *ACM Transactions on Graphics* 23(3):664-672, 2004.

Rajagopalan et al., "Depth Estimation and Image Restoration Using Defocused Stereo Pairs," *IEEE Transactions on Pattern Analysis and Machine Intelligence* 26(11):1521-1525, 2004.

Schechner et al., "Depth from Defocus vs. Stereo: How Different Really Are They?," *International Journal of Computer Vision* 39(2):141-162, 2000.

Shan et al., "High-quality Motion Deblurring from a Single Image," *ACM Transactions on Graphics* 27(3):73:1-73:10, 2008.

Veeraraghavan et al., "Dappled Photography: Mask Enhanced Cameras for Heterodyned Light Fields and Coded Aperture Refocusing," *ACM Transactions on Graphics* (26):12 Pages, 2007.

* cited by examiner

METHODS AND APPARATUS FOR EDITING IMAGES

CROSS REFERENCE OF RELATED APPLICATIONS

The present application claims the benefit of U.S. provisional application 61/278,182 filed on Oct. 2, 2009, which is incorporated herein by reference in its entirety.

TECHNICAL FIELD

The present application refers to image editing, in particular, to methods and apparatus for editing an image having focused and defocused objects.

BACKGROUND

Image focus editing is an interesting research topic and has received a lot of attention recently. Two problems are mainly involved in this topic. One is image refocus, whose interest is to recover a sharpness of a blurry defocused image. The other is defocus magnification. In some photography such as portrait, a shallow depth of field (DOF) is preferred to highlight a foreground subject with a defocused blurry background. But due to limitations of lens and sensors, some cameras (e.g. a point-and-shoot camera) are unable to produce enough defocus effects.

Recently, a number of focus editing algorithms have been proposed, which can be grouped into two types. One is a computational photography, where some additional optical elements or devices are added in the conventional photography to help the sensor code more information about the target scene. The other type is addressed based on image processing technology without changing the camera. Multi-image based method has been widely studied in the past years. However, the more challenging single image based work is presented recently. Bae and Durand proposed a focus map estimation method in "Defocus Magnification" (Eurographics, 2007), in which the defocus magnification is handled with the aid of lens blur in Photoshop®. One bottle neck of this work is the blur estimation part using an unstable brute-force fitting strategy. In addition, a method is proposed by Bando and Nishita in "Towards Digital Refocusing from a Single Photograph" (Pacific Graphics, pp. 363-372, 2007), which requires lots of user interaction to determine the blur kernel from a number of predefined candidates.

SUMMARY

The present application is directed to address at least one of the above problems.

According to an aspect of the present application, a method for editing an image having focused and defocused objects, comprising: determining blurriness of edge pixels in the image; propagating the determined blurriness to non-edge pixels adjacent to each of the edge pixels so as to determine blurriness of the non-edge pixels; estimating a focus map based on the blurriness of the edge pixels and the non-edge pixels to identify the defocused objects; and refocusing the defocused objects based on the focus map.

According to another aspect of the present application, a method for editing an image having focused and defocused objects, comprising: detecting edge pixels in the image; estimating a focus map of the image based on the detected edges to identify the focused objects and the defocused objects; and refocusing the defocused objects, or defocusing at least one of the focused objects and the defocused objects.

According to a further aspect of the present application, an apparatus for editing an image having focused and defocused objects, comprising: a determining module configured to determine blurriness of edge pixels in the image; a propagating module configured to propagate the determined blurriness to non-edge pixels adjacent to each of the edge pixels so as to determine blurriness of the non-edge pixels; an estimating module configured to estimate a focus map based on the blurriness of the edge pixels and the non-edge pixels to identify the defocused objects; and a refocusing module configured to refocus the defocused objects based on the focus map.

In the present application, a simple and well-parameterized multi-point scheme is adopted to measure the edge blurriness. The more challenging refocusing problem is addressed with an elaborate blind deconvolution framework. It is noted that the edge cue is utilized adequately in the present application, not only in focus detection but also in image refocusing. Furthermore, according to the present application, the optimal blur kernel and the target sharp image are obtained simultaneously using a well regularized blind deconvolution approach.

In this application, a method and a system to handle all the tasks in focus editing such as focus map estimation, image refocusing and defocusing is provided. Firstly, benefiting from the well-parameterized edge model, the focus map estimation method proposed herein is simpler but more effective. Secondly, the challenging refocusing problem is well handled through an elaborate SBD framework. Especially, owing to the novel image sharp prior, the method according to the present application yields pleasant results with finest details. Besides, the proposed SBD is free of user initialization and computationally efficient. Various real images have been used to validate the proposed approach.

DETAILED DESCRIPTION

Hereinafter, embodiments according to the present application will be described in detail with reference to the accompanying drawings.

In this application, a single image focus editing method is proposed to handle the tasks of focus map estimation, image refocus and defocus. The single image may comprise a focused object such as a foreground and a defocused object such as a background. The focused and defocused objects are identified and separated by using a focus map of the image firstly in methods according to the present application.

Problem Formulation

Figure 1:
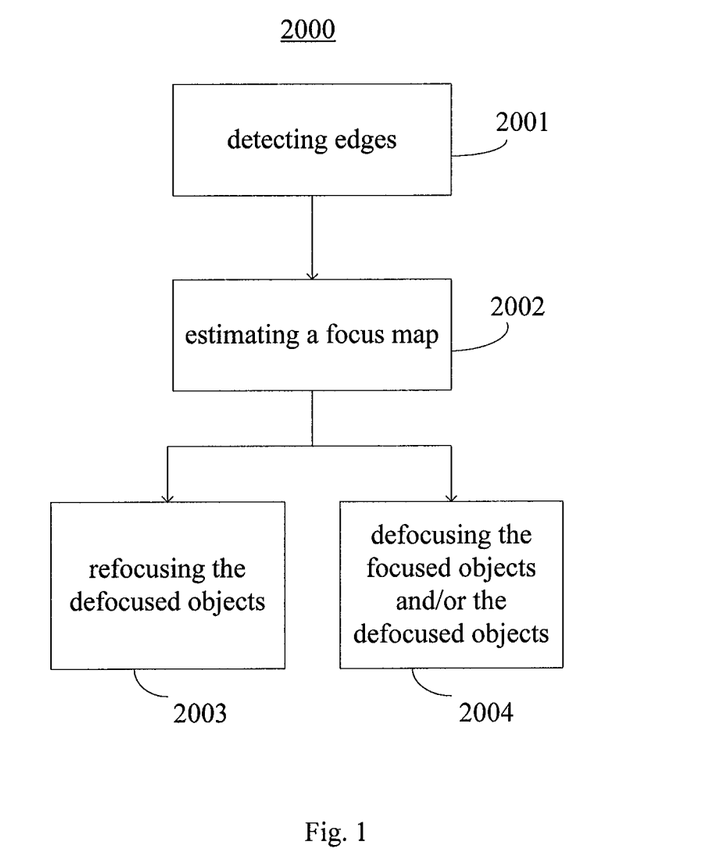
FIG. 1 illustrates a flowchart of the image editing method according to the present application.

As shown in FIG. 1, rays originating from a scene point P1 on a focal plane converges to a point on an image plane. However, when the scene point moves away from the focal plane, the rays will give rise to a blur circle on the image plane and the image is regarded as defocused. When the point moves farther, a more blurry defocused image I is produced. Theoretically, I can be regarded as a result of convolving the focused image F with the camera's PSF h.

$$I = h \otimes F + n, \quad (1)$$

where n denotes the image noise. Due to the diffraction and aberration of the camera lens, the PSF is normally approximated with a 2-D Gaussian filter given by $$g(x, y; \sigma_f) = \frac{1}{\sqrt{2\pi\sigma_f^2}} \exp\left(\frac{-(x^2 + y^2)}{2\sigma_f^2}\right).$$

The spread parameter $\sigma_f$ which is related to the distance of the object to the focal plane determines the blurriness of the captured image. So in this application, the Gaussian blurring is used to simulate the defocus effect so that the defocus effect is able to be flexibly controlled by changing $\sigma_f$.

Figure 2:
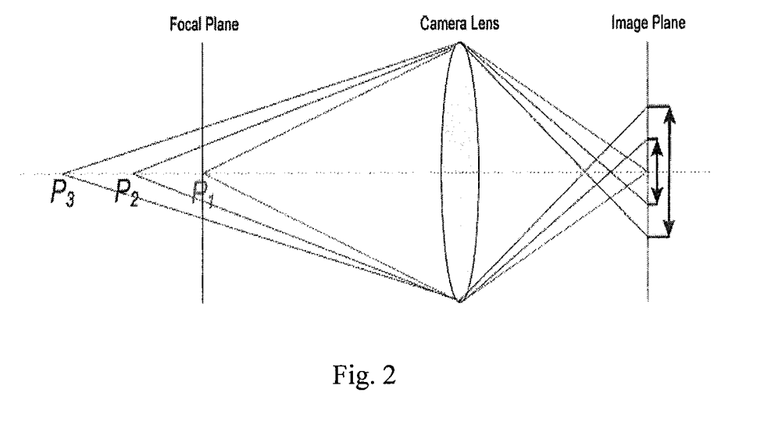
FIG. 2 is geometry of the imaging model, wherein P1, P2 and P3 represent the scene points at different depth.

Referring to FIG. 2, a method 2000 for editing a single image according to the present application is provided. As shown, edges in the image are detected at step 2001; and a focus map of the image is estimated at step 2002 based on the detected edges so that the focused objects and the defocused objects are identified. In this application, it is assumed that a blurring of an edge is only due to the defocus effect. So focus information can be indicated by the edge blurriness.

Edge Detecting

Image focus detection and editing on a single image is very challenging since insufficient available data is contained in the image. Fortunately, edges in the image carry important information which can reflect characteristics of the image's formation. For a given image, a response containing edge information may be obtained by convolving the image with a 2-D Gaussian filter. Peaks of the response may be used to locate the edge. However, in practice, the edge position is constrained to a grid point location which may not coincide with the truth. In such circumstances, a well-parameterized model is adopted in the present application to depict the edges explicitly, as will be discussed below.

Figure 3A:
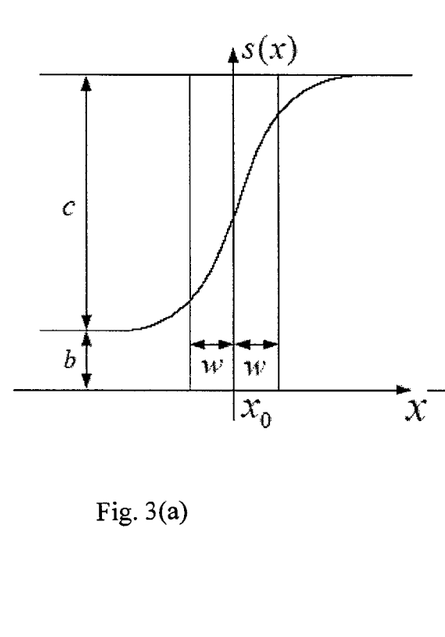
FIG. 3(a) is a 1-D parametric edge model.
Figure 3B:
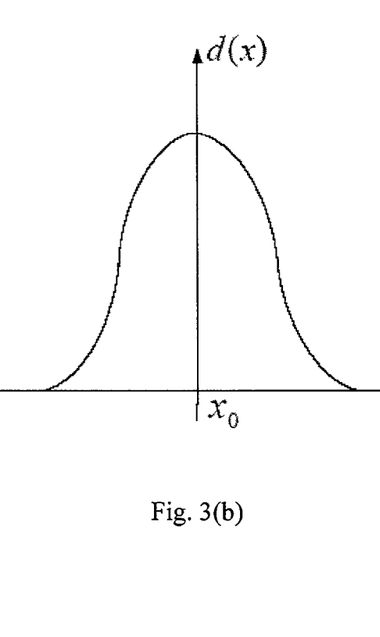
FIG. 3(b) is response of convolving an edge with the derivative of a Gaussian filter.

For simplicity, a 1-D edge is discussed as an example, and thus a 1-D Gaussian filter is used in this example. For example, a smoothed edge is shown in FIG. 3(a) and a response obtained by convolving the edge with a 1-D Gaussian filter is shown in FIG. 3(b). The peak $d_1$ in FIG. 3(b) is considered as an edge pixel. It can be understood that a plurality of peaks may be contained in the response and thus parameters for all the plurality of peaks may be determined. The above derivation may be referred as a multi-point estimation method and all pixels in the edge may be determined accordingly.

Similarly, for a 2-D image, a response may be obtained by convolving the image with a 2-D Gaussian filter and peaks of the response may be used to locate the edge, as shown in FIG. 3(b).

Edge Based Focus Map Estimation

After the edge pixels are detected in step 2001, the focus map is estimated based on the detected edge in step 2002 by the following steps 2021-2023.

First of all, edge-associated parameters of each of edge pixels on the detected edges are calculated at step 2021. In this step, a parameterized model is introduced as below.

Mathematically, an ideal step edge at edge pixels x in the image may be denoted as $e(x; b, c, x_0) = eU(x-x_0) + b$, where $U(\bullet)$ is a unit step function, b denotes an edge basis, c represents an edge contrast and $x_0$ denotes an edge center. A smoothed edge $s(x; b, c, w, x_0)$ as shown in FIG. 3(a) may be obtained by convolving $e(x; b, c, x_0)$ with a 1-D Gaussian filter $$g(x; w) = \frac{1}{\sqrt{2\pi w^2}} \exp\left(\frac{-x^2}{2w^2}\right)$$

as:

$$s(x; b, c, w, x_0) = b + \frac{c}{2}\left(1 + \operatorname{erf}\left(\frac{x - x_0}{w\sqrt{2}}\right)\right), \quad (2)$$

where $\operatorname{erf}(\bullet)$ is an error function and w originates from a standard derivation of a blurring kernel and may be referred as an edge width parameter. The edge is sharper when w becomes smaller.

Thus the response obtained by convolving $s(x; b, c, w, x_0)$ with a derivative of a predefined Gaussian filter $g'_d(x; \sigma_d)$ may be denoted as:

$$d(x; c, w, \sigma_d) = \frac{c}{\sqrt{2\pi(w^2 + \sigma_d^2)}} \exp\left(\frac{-(x - x_0)^2}{2(w^2 + \sigma_d^2)}\right) \quad (3)$$

wherein $\sigma_d$ is a parameter which may be preset as desired.

According to the above model, after the response is obtained, assuming the detected peak lies at $x=0$, three point responses may be selected by sampling at $x=-a, 0, a$, where $d_1 = d(0; c, w, \sigma_d)$, $d_2 = d(a; c, w, \sigma_d)$ and $d_3 = d(-a; c, w, \sigma_d)$. a may be chosen freely and normally $a=1$ is practical. Then parameters for all the edge pixels may be determined as follows:

$$c = d_1 \cdot \sqrt{2\pi a^2 / \ln(l_1)} \cdot l_2^{\frac{1}{4n}}, \quad (4)$$

$$w = \sqrt{a^2 / \ln(l_1) - \sigma_d^2}, \quad (5)$$

$$x_0 = 0.5 \cdot a \cdot \ln(l_2) / \ln(l_1), \quad (6)$$

$$b = s(x_0) - c/2, \quad (7)$$

where $l_1 = d_1^2/d_2 d_3$ and $l_2 = d_2/d_3$. According to an embodiment, a single scale Gaussian filter may be employed to detect the edges in the image, wherein the parameter $\sigma_d$ may be preset as desire and [1, 3] may be a reasonable range.

Thus, edge-associated parameters of each of edge pixels on the detected edges may be calculated based on the Eq. (4)-Eq. (7). In this model, since the parameter $x_0$ is introduced to reflect the derivation of the peak with respect to the actual edge position continuously, the edge position determined from this model will coincide with the truth. Optionally, a bilateral filtering may be conducted to refine the obtained edge blurriness results so as to remove outliers that may occur in edge detection and parameter calculation.

Then, in the step 2022, the blurriness w for edge pixels are to be propagated to their neighboring non-edge pixels. Considering that spatial neighboring pixels with similar colors may be reasonably assumed share similar blurriness, the blurriness information at edge pixels may be propagated to their neighboring non-edge pixels based on the similarities of intensity and position. According to an embodiment, such propagation is formulated using a known image colorization as a minimization of a quadratic cost function whose optimization can be solved efficiently within a linear system.

Figure 3C:
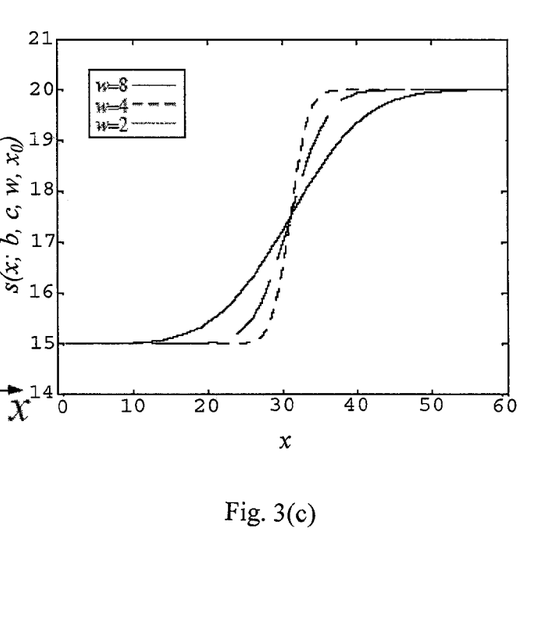
FIG. 3(c) illustrates effects of changing w, wherein the original edge is figured by the black line, dashed and dotted lines denote the new edges reconstructed by decreasing w.
Figure 4:
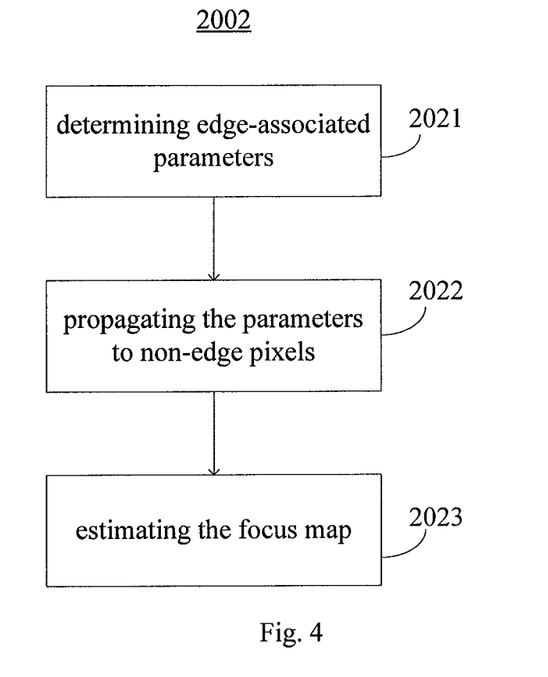
FIG. 4 illustrates a flowchart of the estimation step in the method shown in FIG. 1.

With the above mentioned parametric model, the edge may be changed easily by controlling these parameters. For example, as shown in FIG. 3(c), decreasing w will result in a sharper edge. After the edge is detected and the parameters are estimated, the edge may be reconstructed by substituting the new w' to Eq. (2) and keeping the other parameters unchanged. The lines in FIG. 3(c) show the reconstructed edges with w'=w/2 and w'=w/4 respectively. Apparently, the smaller the w is, the sharper the reconstructed edge is. It is noted that all above analysis may be extended to 2-D case directly except that an extra parameter θ is required to represent the edge direction.

After the blurriness of non-edge pixels is determined in step 2022, a focus map reflecting the blurriness of all pixels in the image is determined in step 2023.

As aforementioned, the edge blurriness carry important cue about the focus setting and different blurriness imply different defocus scales. According to the present application, pixels having different blurriness may have different blurriness values and thus a focus map (or blurriness map) reflecting the difference may be obtained. According to an embodiment, the blurriness w has a value in a range of [0, 1]. A sharp pixel may have a blurriness value close to 0, while a blurry pixel may have a blurriness value close to 1. According to an embodiment, taking colors of different gray scales to represent pixels having different blurriness, the focus map is thus obtained.

According to the present application, since the edge parameters are derived in closed form rather than an approximated fitting and an extra parameter $x_0$ is introduced to locate the true edge position more accurately in sub-pixel level, this can compensate the effect that occurs when the actual edge center lies somewhere between two grid points without a high computational complexity.

Typical experiments have been designed to test the method according to the present application. Results prove that the edge blurriness is measured well with the method according to the present application. In particular, the focus map obtained by the method according to the present application has less outliers and much closer to the perceived truth. Moreover, the method according to the present application is more efficient and takes less time. In order to further evaluate the accuracy of the focus map, a lens blur of Photoshop may be employed and it is found that a result with more visually realistic is obtained by using the method according to the present application.

According to an embodiment, the method for editing a single image according to the present application may further comprises a step 2003 of refocusing the defocused objects or a step 2004 of defocusing at least one of the focused objects and the defocused objects, as shown in FIG. 1. Since the step 2004 may be performed simply by Gaussian blurring, it will not be described in detail. Hereinafter, the step 2003 will be discussed as below.

Image Refocusing

Compared to defocusing, refocusing is radically more challenging. As aforementioned, image refocusing can be regarded a single image blind deconvolution (SBD) problem whose goal is to recover the sharp image as well as the PSF simultaneously from a blurry input. However, the SBD is highly ill-posed since that the blurry image can be obtained by the convolution of many different pairs of sharp images and PSFs. Recently, a number of methods have been presented and most of them are working in a computationally expensive iterative manner. The latent sharp image and PSF are updated iteratively until convergence. Besides, a good initialization is often necessary to avoid the convergence at a local minimum. Although promising results have been presented in the past years, the current state-of-the-art SBD technology is still limited and does not work well in recovering a reliably sharp image from the out-of-focus blurring. The main problem of these works is that the edge sharpness cue is not utilized adequately.

According to this application, a refocusing method that takes advantage of the edge sharpness cue throughout the whole SBD process is proposed. In specific, a sharp prior may be established according to the edge information obtained in the steps 2001 and 2002 so as to ensure the sharpness of the refocused image, and a local prior may be established to constrain the low-contrast regions unchanged for suppressing the ring artifacts. The sharp prior and the local prior may form a Sharp-and-Smooth prior (SSP) which will be firstly utilized for the PSF estimation. Besides, a global prior may be further established to ensure the smoothness of the whole image. The SSP and the global prior may be embedded in an elaborate MAP framework to provide a sound regularization for ensuring the image sharpness and suppressing ring artifacts. Next, the proposed SBD approach will be presented by assuming the PSF is spatially invariant for simplicity.

Figure 5:
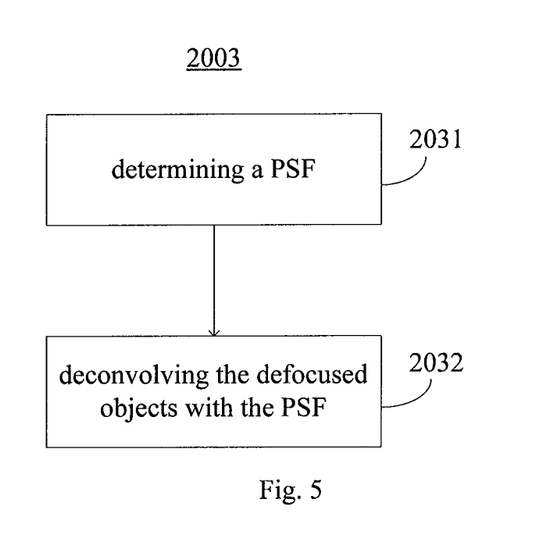
FIG. 5 illustrates a flowchart of the refocusing step in the method shown in FIG. 1.

Referring to FIG. 5, the step 2003 of refocusing may comprises a step 2031 of determining a point spread function based on the detected edges and a step 2032 of deconvolving the defocused objects with the point spread function, as will be described below.

Estimating the PSF Based on the SSP

Given a defocused blurry image I, two predictions about its corresponding focused image F can be made as follows. Firstly, the edges should become sharpened in F. Secondly, the locally smooth regions of the defocused image almost remain unchanged after deconvolution.

Benefiting from the parametric edge model introduced in the portion of edge modeling, the first prediction may be formulated explicitly by ensuring a small width parameter w in Eq. (2) for each refocused edge. In detail, for a blurry input, its predicted image $F_p$ with sharp edge may be reconstructed by decreasing the width parameter w (e.g. setting w'=w/10) similar with that in FIG. 3(c). Besides, a binary edge mask $M_e$ may also be determined according to the detected edges and their nearest neighbors to locate the edge regions which comprise all edge pixels and their nearest neighbors. With corresponding $M_e$ and $F_p$, edges detected in an input I will be sharpened significantly.

The other prediction is based on the fact that the degradation caused by defocusing may be approximated as Gaussian blurring (smoothing). In this prediction, a binary edge mask $M_s$, may also be determined to locate the locally smooth region of the defocus image I. The locally smooth region of the defocused image I and its corresponding region in the focused image F should have similar low contrast. According to an embodiment, the local smooth region may be determined in such as manner that, for each pixel in I, a window centering at it and having a similar size with the PSF is defined. If the standard derivation of this window is smaller than a threshold, this pixel will be regarded as locally smoothed.

As shown in Eq. (8), the optimal h can be obtained with a maximum a posteriori (MAP) framework.

$$h^* = \underset{h}{\mathrm{argmax}}\, p(h \mid I, F) = \underset{h}{\mathrm{argmax}}\, p(I \mid F, h) p(h), \qquad (8)$$

where the likelihood term p(I|F,h) may be defined based on the image formation model stated in Eq. (1) by assuming that I differ from the convolution of F with the PSF h by a zero mean Gaussian noise of variance $$\frac{1}{2\alpha_n}.$$

That is, $$p(I|F,h) \propto \exp(-\alpha_n \|h \otimes F - I\|_2^2). \qquad (9)$$

Similarly, two likelihoods corresponding to the above two predictions can be defined as:

$$p_e(I|F, M_e, h) \propto \exp(-\alpha_{e_1} M_e \circ \|h \otimes F_p - I\|_2^2) \qquad (10)$$

$$p_s(I|F, M_s, h) \propto \exp(-\alpha_{s_1} M_s \circ \|h \otimes I - I\|_2^2), \qquad (11)$$

where $\circ$ denotes element-wise multiplication operation. Based on Eq. (8), an energy term can be defined as:

$$E_h(h) = \alpha_{e_1} M_e \circ \|h \otimes F_p - I\|_2^2 + \alpha_{s_1} M_s \circ \|h \otimes I - I\|_2^2 + \|h\|_1, \qquad (12)$$

where the parameters $\alpha_{e_1}$ and $\alpha_{s_1}$ are weights which may be set and modified, and the PSF prior p(h) is defined using a general l1 norm sparse prior with non-negativity constraint. Benefiting from the recent development in compressed sensing, the optimization of Eq. (12) may be solved effectively and thus the PSF h may be determined.

Recovery of the Focused Sharp Image

When h is determined, the inference of F will turn to be a non-blind deconvolution problem as:

$$F^* = \underset{F}{\mathrm{argmax}}\, p(F \mid I, h) = \underset{F}{\mathrm{argmax}}\, p(I \mid F, h) p(F) \qquad (13)$$

A sound image prior p(F) is necessary to regularize this ill posed problem as well-posed. In this application, p(F) is defined by combining three different priors as:

$$p(F) = p_g(F) p_e(F) p_s(F) \qquad (14)$$

where $p_g(F)$ is a global prior, the other two local priors $p_e(F)$ and $p_s(F)$ are introduced based on the aforementioned predictions. The global prior $p_g(F)$ may be defined as follows by using a total variation regularizer because of its good performance on preserving sharp edges and reducing image artifacts.

$$p_g(F) \propto \exp\!\left(-\alpha_g \sum_i \|t_i \otimes F\|_2\right) \qquad (15)$$

where $t_i$ (i=1, 2) can be simply defined by the horizontal and vertical first order derivative filters: $t_1 = [1\ -1]$ and $t_2 = [1\ -1]^T$.

Benefiting from the first sharp prediction, a local sharp prior $p_e(F)$ may be produced based on the fact the edge regions of the latent focused image F should have similar sharpness with that of the predicted $F_p$. As shown in Eq. 16, this similarity is defined with the first order derivatives and the errors are assumed to be zero mean Gaussian distributed with variance $$\frac{1}{2\alpha_{e_2}}.$$

$$p_e(F) \propto \exp\!\left(-\alpha_{e_2} \sum_i M_e \circ \|t_i \otimes F - t_i \otimes F_p\|_2^2\right) \qquad (16)$$

Another local smooth prior $p_s(F)$ may also be introduced for suppressing the ring artifacts. Based on the second prediction, $p_s(F)$ may be defined so that the smooth regions of the defocused image I and the latent focused image F share similar first order derivatives.

$$p_s(F) \propto \exp\!\left(-\alpha_{s_2} \sum_i M_s \circ \|t_i \otimes F - t_i \otimes I\|_2^2\right) \qquad (17)$$

where the differences are assumed to be zero mean Gaussian distributed with variance $$\frac{1}{2\alpha_{s_2}}.$$

The maximization problem in Eq. (13) may also be rendered as a minimization of an energy term defined using Eq. (9) and Eqs. (13)-(17).

$$E_F(F) = \alpha_n \|h \otimes F - I\|_2^2 + \alpha_g \sum_i \|t_i \otimes F\|_2 + \qquad (18)$$
$$\alpha_{e_2} \sum_i M_e \circ \|t_i \otimes F - t_i \otimes F_p\|_2^2 + \alpha_{s_2} \sum_i M_s \circ \|t_i \otimes F - t_i \otimes I\|_2^2$$

where the third and fourth terms of the right-hand side are for suppressing ringing artifacts and ensuring image sharpness respectively. The refocused image F may be determined by minimizing the energy $E_F(F)$.

However, directly minimizing Eq. (18) is intractable since $E_F$ is non-quadratic to the unknown F. In such circumstances, according to an embodiment, a prevalent variable-splitting and penalty scheme is adopted here to tackle this challenging optimization problem. In detail, two variables $\xi_1$ and $\xi_2$ are introduced to replace $t_1 \otimes F$ and $t_2 \otimes F$ respectively and penalize the discrepancy between them by a quadratic penalty. Hence, Eq. (18) becomes:

$$E_F(F) = \alpha_n \|h \otimes F - I\|_2^2 + \alpha_g \sum_i \|\xi_i\|_2 + \alpha_{e_2} \sum_i M_e \circ \|\xi_i - t_i \otimes F_p\|_2^2 + \qquad (19)$$
$$\alpha_{s_2} \sum_i M_s \circ \|\xi_i - t_i \otimes I\|_2^2 + \lambda \sum_i \|\xi_i - t_i \otimes F\|_2^2$$

Iterative scheme may employed to update the unknown F and $\xi_1$ alternatively with an increasing penalty parameter $\lambda$. The result of minimizing Eq. (19) will converge to that of minimizing Eq. (18) when $\lambda$ becomes large enough. In each iteration, when F is fixed, the update of $\xi_i$ (i=1, 2) is to minimize $E_{F\xi}(\xi_i)$ separated from $E_F(F)$.

$$E_{F\xi}(\xi_i) = \alpha_{s_2} \sum_i M_s \circ \|\xi_i - t_i \otimes I\|_2^2 + \qquad (20)$$

$$\lambda \sum_i \|\xi_i - t_i \otimes F\|_2^2 + \alpha_{e_2} \sum_i M_e \circ \|\xi_i - t_i \otimes F_p\|_2^2 + \alpha_g \sum_i \|\xi_i\|_2$$

Since $E_{F\xi}(\xi_i)$ is differential to $\xi_i$, a closed-form solution may be obtained. Note that $\xi_i$ should be updated pixel by pixel due to the existence of $M_s$ and $M_e$. Next, when $\xi_i$ is fixed, the update of F is to minimize $E_{FF}(F)$ separated from $E_F(F)$.

$$E_{FF}(F) = \alpha_n \|h \otimes F - I\|_2^2 + \lambda \sum_i \|\xi_i - t_i \otimes F\|_2^2 \qquad (21)$$

where $E_{FF}(F)$ is quadratic to F and its minimization is an easy least square problem which also has a closed-form solution. Besides, in order to avoid the computational complexity caused by convolution, it would be better to tackle the above least square problem in the Fourier transform domain (applying the Fourier transform to $E_{FF}(F)$). In the experiments, $\lambda$ is set to 1 at the beginning and then increases by 2 times after each iteration. The other weighting factors (such as $\alpha_n$, $\alpha_{e1}$, $\alpha_{e2}$) can be set empirically according to the noise level, quality of the predicted image $F_p$ and so on.

Accordingly, the refocused image F is determined.

The method proposed method is robust to outliers due to influence of noise and nearby edges, since that the estimations of h and F are handled in two separated MAP frameworks where the predicted sharp edges are only one constraint for ensuring sharpness. So the influence of these outliers will be eliminated by the other constraints (e.g. the smoothness term). Moreover, since it is not necessary to update PSF and the latent sharp image iteratively, the present method has lower computational complexity.

Figure 6:
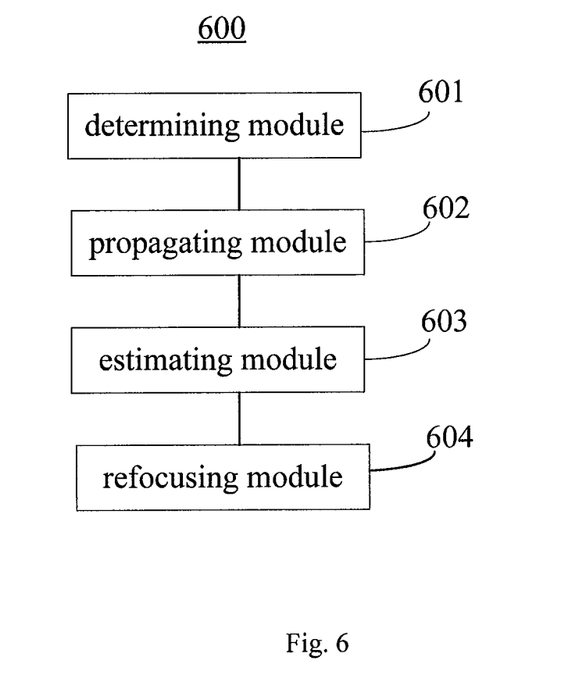
FIG. 6 illustrates a block view of the image editing apparatus according to the present application.

According to an embodiment of the present application, an image editing apparatus in which the various illustrated embodiments can be implemented is also provided. Referring to FIG. 6, an image editing apparatus 600 for editing an image having focused and defocused objects according to the present application may comprises a determining module 601 configured to determine blurriness of edge pixels in the image; a propagating module 602 configured to propagate the determined blurriness to non-edge pixels adjacent to each of the edge pixels so as to determine blurriness of the non-edge pixels; an estimating module 603 configured to estimate a focus map based on the blurriness of the edge pixels and the non-edge pixels to identify the defocused objects; and a refocusing module 604 configured to refocus the defocused objects based on the focus map.

According to an embodiment, the refocusing module may be configured to refocus the defocused objects based on the focus map by a blind deconvolution. According to an embodiment, the refocusing module may comprise: a determining unit configured to determine a point spread function based on the focus map; and a deconvolving unit configured to defocus the defocused objects with the point spread function so as to obtain the refocused image. According to an embodiment, at least one prior of the image may be established based on the focused map, and the determining unit is configured to determine the point spread function based on the established prior by using a maximum a posteriori (MAP). According to an embodiment, the established prior may comprise a local sharp prior for ensuring a sharpness of edge pixels in the refocused image and/or a local smooth prior for ensuring a smoothness of non-edge pixels in the refocused image. According to an embodiment, the established prior may further comprise a global prior for ensuring a smoothness of the refocused image. According to an embodiment, the focus map may comprise the blurriness of each pixel in the image. According to an embodiment, the apparatus further comprises a convolving module configured to convolve the image with a derivative of a Gaussian filter to determine an edge-associated curve; and a selecting module configured to select peaks of the curve as the edge pixels. According to an embodiment, the curve may be formulating as a function $$d(x; c, w, \sigma_d) = \frac{c}{\sqrt{2\pi(w^2 + \sigma_d^2)}} \exp\left(\frac{-(x - x_0)}{2(w^2 + \sigma_d^2)}\right),$$

and the determining module comprises: a sampling unit configured to sample points with different values x from the curve; and a determine unit configured to configured to determine the blurriness w according to function values of the sampled points, wherein c is an edge contrast, $x_0$ is an edge center, $\sigma_d$ is a parameter in a Gaussian filter which is chosen experientially, and wherein $\sigma_d$ may be in a range from 1 to 3.

According to an embodiment, provided is an apparatus for editing an image having focused and defocused objects, comprising: a determining module configured to determine blurriness of edge pixels in the image; a propagating module configured to propagate the determined blurriness to non-edge pixels adjacent to each of the edge pixels so as to determine blurriness of the non-edge pixels; an estimating module configured to estimate a focus map based on the blurriness of the edge pixels and the non-edge pixels to identify the defocused objects; and a defocusing module configured to defocusing at least one of the focused objects and the defocused objects. In this embodiment, the defocusing module may be configured to defocusing at least one of the focused objects and the defocused objects by Gaussian blurring.

Figure 7:
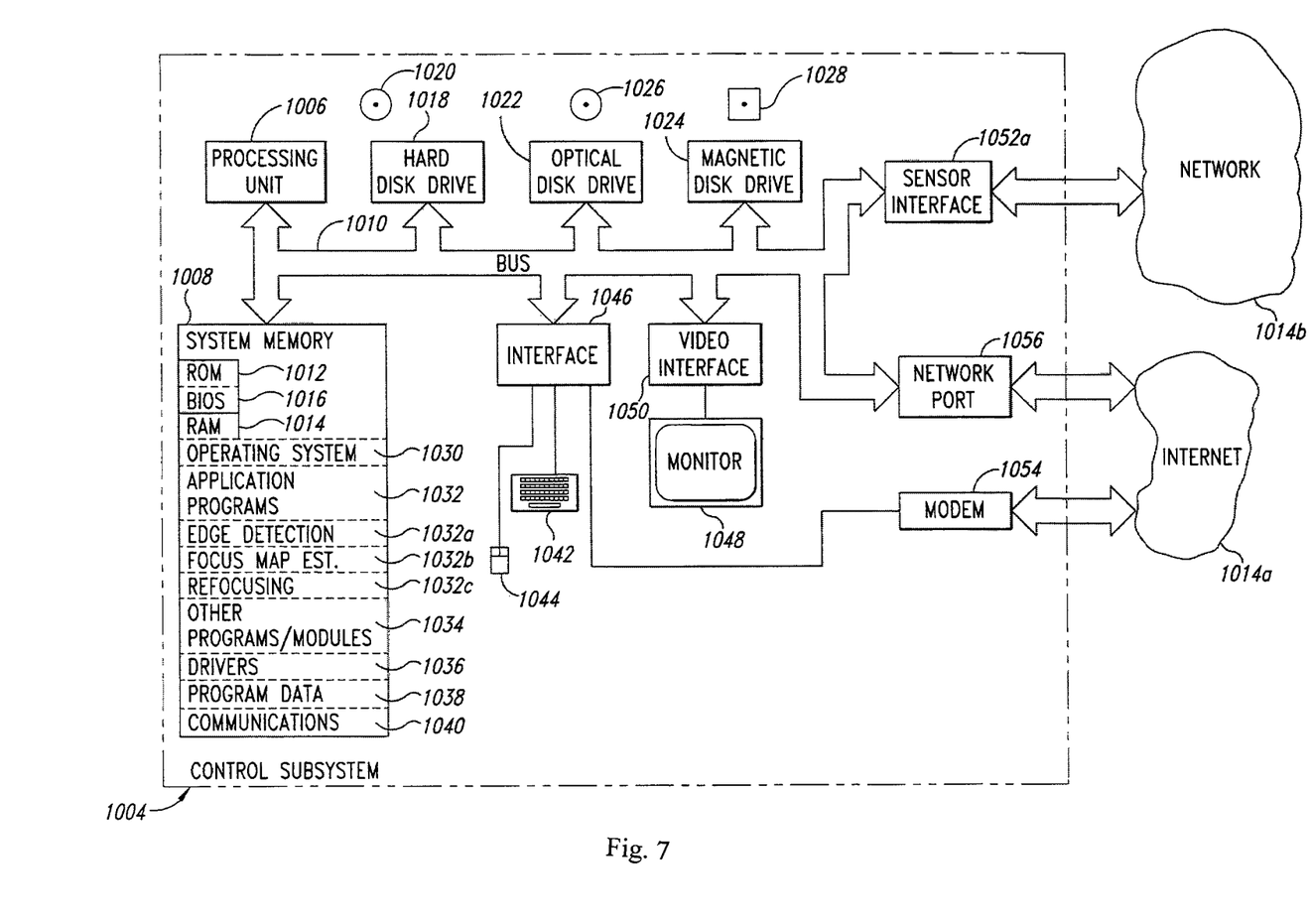
FIG. 7 illustrates a processor based image editing system, according to one illustrated embodiment, suitable for carrying out the image editing described herein.

Referring to FIG. 7, an image editing system 1004 in which various illustrated embodiments can be implemented is shown. Although not required, some portion of the embodiments will be described in the general context of computer-executable instructions or logic, such as program application modules, objects, or macros being executed by a computer. Those skilled in the relevant art will appreciate that the illustrated embodiments as well as other embodiments can be practiced with other computer system configurations, including handheld devices, multiprocessor systems, microprocessor-based or programmable consumer electronics, personal computers ("PCs"), network PCs, minicomputers, mainframe computers, and the like. The embodiments can be practiced in distributed computing environments where tasks or modules are performed by remote processing devices, which are linked through a communications network. In a distributed computing environment, program modules may be located in both local and remote memory storage devices.

The image editing system 1004 may take the form of a conventional PC, which includes a processing unit 1006, a system memory 1008 and a system bus 1010 that couples various system components including the system memory 1008 to the processing unit 1006. The image editing system 1004 will at times be referred to in the singular herein, but this is not intended to limit the embodiments to a single system, since in certain embodiments, there will be more than one system or other networked computing device involved. Non-limiting examples of commercially available systems include, but are not limited to, an 80x86 or Pentium series microprocessor from Intel Corporation, U.S.A., a PowerPC microprocessor from IBM, a Sparc microprocessor from Sun Microsystems, Inc., a PA-RISC series microprocessor from Hewlett-Packard Company, or a 68xxx series microprocessor from Motorola Corporation.

The processing unit 1006 may be any logic processing unit, such as one or more central processing units (CPUs), microprocessors, digital signal processors (DSPs), application-specific integrated circuits (ASICs), field programmable gate arrays (FPGAs), etc. Unless described otherwise, the construction and operation of the various blocks shown in FIG. 7 are of conventional design. As a result, such blocks need not be described in further detail herein, as they will be understood by those skilled in the relevant art.

The system bus 1010 can employ any known bus structures or architectures, including a memory bus with memory controller, a peripheral bus, and a local bus. The system memory 1008 includes read-only memory ("ROM") 1012 and random access memory ("RAM") 1014. A basic input/output system ("BIOS") 1016, which can form part of the ROM 1012, contains basic routines that help transfer information between elements within the image editing system 1004, such as during start-up. Some embodiments may employ separate buses for data, instructions and power.

The image editing system 1004 also includes a hard disk drive 1018 for reading from and writing to a hard disk 1020, and an optical disk drive 1022 and a magnetic disk drive 1024 for reading from and writing to removable optical disks 1026 and magnetic disks 1028, respectively. The optical disk 1026 can be a CD or a DVD, while the magnetic disk 1028 can be a magnetic floppy disk or diskette. The hard disk drive 1018, optical disk drive 1022 and magnetic disk drive 1024 communicate with the processing unit 1006 via the system bus 1010. The hard disk drive 1018, optical disk drive 1022 and magnetic disk drive 1024 may include interfaces or controllers (not shown) coupled between such drives and the system bus 1010, as is known by those skilled in the relevant art. The drives 1018, 1022, 1024, and their associated computer-readable media 1020, 1026, 1028, provide nonvolatile storage of computer-readable instructions, data structures, program modules and other data for the image editing system 1004. Although the depicted image editing system 1004 employs hard disk 1020, optical disk 1026 and magnetic disk 1028, those skilled in the relevant art will appreciate that other types of computer-readable media that can store data accessible by a computer may be employed, such as magnetic cassettes, flash memory cards, Bernoulli cartridges, RAMs, ROMs, smart cards, etc.

Program modules can be stored in the system memory 1008, such as an operating system 1030, one or more application programs 1032, other programs or modules 1034, drivers 1036 and program data 1038.

The application programs 1032 may, for example, include edge detection logic 1032a, focus map estimating logic 1032b, and refocusing logic 1032c. The logic 1032a-1032c may, for example, be stored as one or more executable instructions. The edge detection logic 1032a may include logic or instructions to detect edges in images or image data. The focus map estimating logic 1032b may include logic to estimate a focus map, and may include calculating logic to calculate edge-associated parameters, propagating logic to propagate the calculated edge-associated parameters to non-edge pixels, and estimating logic to estimate the focus map based on the edge associated parameters of both edge pixels and non-edge pixels. The refocusing logic 1032c may refocus defocused objects using blind deconvolution, and may include determining logic to determine a point spread function based on detected edges, and deconvolving logic configured to deconvolve the defocused objects using the point spread function.

The system memory 1008 may also include communications programs 1040, for example a server and/or a Web client or browser for permitting the image editing system 1004 to access and exchange data with other systems such as user computing systems, Web sites on the Internet, corporate intranets, or other networks as described below. The communications programs 1040 in the depicted embodiment is markup language based, such as Hypertext Markup Language (HTML), Extensible Markup Language (XML) or Wireless Markup Language (WML), and operates with markup languages that use syntactically delimited characters added to the data of a document to represent the structure of the document. A number of servers and/or Web clients or browsers are commercially available such as those from Mozilla Corporation of California and Microsoft of Washington.

While shown in FIG. 7 as being stored in the system memory 1008, the operating system 1030, application programs 1032, other programs/modules 1034, drivers 1036, program data 1038 and server and/or browser 1040 can be stored on the hard disk 1020 of the hard disk drive 1018, the optical disk 1026 of the optical disk drive 1022 and/or the magnetic disk 1028 of the magnetic disk drive 1024. A user can enter commands and information into the image editing system 1004 through input devices such as a touch screen or keyboard 1042 and/or a pointing device such as a mouse 1044. Other input devices can include a microphone, joystick, game pad, tablet, scanner, biometric scanning device, etc. These and other input devices are connected to the processing unit 1006 through an interface 1046 such as a universal serial bus ("USB") interface that couples to the system bus 1010, although other interfaces such as a parallel port, a game port or a wireless interface or a serial port may be used. A monitor 1048 or other display device is coupled to the system bus 1010 via a video interface 1050, such as a video adapter. Although not shown, the image editing system 1004 can include other output devices, such as speakers, printers, etc.

The image editing system 1004 operates in a networked environment using one or more of the logical connections to communicate with one or more remote computers, servers and/or devices via one or more communications channels, for example, one or more networks 1014a, 1014b. These logical connections may facilitate any known method of permitting computers to communicate, such as through one or more LANs and/or WANs, such as the Internet. Such networking environments are well known in wired and wireless enterprise-wide computer networks, intranets, extranets, and the Internet. Other embodiments include other types of communication networks including telecommunications networks, cellular networks, paging networks, and other mobile networks.

When used in a WAN networking environment, the image editing system 1004 may include a modem 1054 for establishing communications over the WAN, for instance the Internet 1014a. The modem 1054 is shown in FIG. 7 as communicatively linked between the interface 1046 and the Internet 1014a. Additionally or alternatively, another device, such as a network port 1056, that is communicatively linked to the system bus 1010, may be used for establishing communications over the Internet 1014a. Further, one or more network interfaces 1032a-1052d, that are communicatively linked to the system bus 1010, may be used for establishing communications over a LAN 1014b. In particular, a sensor interface 1022a may provide communications with a sensor subsystem (e.g., camera).

In a networked environment, program modules, application programs, or data, or portions thereof, can be stored in a server computing system (not shown). Those skilled in the relevant art will recognize that the network connections shown in FIG. 7 are only some examples of ways of establishing communications between computers, and other connections may be used, including wirelessly.

For convenience, the processing unit 1006, system memory 1008, network port 1056 and interfaces 1046, 1052a-1052c are illustrated as communicatively coupled to each other via the system bus 1010, thereby providing connectivity between the above-described components. In alternative embodiments of the image editing system 1004, the above-described components may be communicatively coupled in a different manner than illustrated in FIG. 7. For example, one or more of the above-described components may be directly coupled to other components, or may be coupled to each other, via intermediary components (not shown). In some embodiments, system bus 1010 is omitted and the components are coupled directly to each other using suitable connections.

It is noted that unlike the known multi-image based approach, the occlusion problem is not formulated directly into the imaging model in this application, because the single image based work itself is already highly unconstrained and adding more unknowns will make the whole framework intractable. However, owing to the estimated focus map, the possible occlusion regions is located along the layer boundaries and then use alpha blending to synthesize these regions to avoid artifacts. The results show that this is a visually realistic way to handle the occlusion problem. However, the investigation on the issues of object occlusion as well as translucence in single image based work would be an interesting future research topic. Besides, the basic idea of the present application can be further extended to other low level vision problems such as spatially variant deblurring.

The present invention is not limited to the description and embodiments mentioned above. Other embodiments obtained by the skilled in the art according to the disclosure of the present application without departing from the spirit of the present invention should be within the scope of the present invention.

What is claimed is:

1. A method for editing an image having defocused objects, comprising:
    determining by at least one processor, a blurriness of edge pixels in the image, the blurriness representing an edge width of said pixels;
    propagating by the at least one processor the determined blurriness to non-edge pixels adjacent to each of the edge pixels so as to determine blurriness of the non-edge pixels;
    estimating by the at least one processor a focus map based on the blurriness of the edge pixels and the non-edge pixels to identify the defocused objects; and
    refocusing the defocused objects by the at least one processor based on the focus map.

2. The method of claim 1, wherein the refocusing comprises:
    refocusing the defocused objects based on the focus map by a blind deconvolution.

3. The method of claim 2, wherein the refocusing comprises:
    determining a point spread function based on the focus map; and
    deconvolving the defocused objects with the point spread function so as to obtain the refocused image.

4. The method of claim 3, wherein the determining comprises:
    establishing at least one prior of the image based on the focus map; and
    determining the point spread function based on the established prior by using a maximum a posteriori (MAP).

5. The method of claim 4, wherein the established prior comprises a local sharp prior for ensuring a sharpness of edge pixels in the refocused image and/or a local smooth prior for ensuring a smoothness of non-edge pixels in the refocused image.

6. The method of claim 5, wherein the established prior further comprises a global prior for ensuring a smoothness of the refocused image.

7. The method of claim 1, wherein the focus map comprises the blurriness of each pixel in the image.

8. The method of claim 1, further comprising:
    convolving the image with a derivative of a Gaussian filter to determine an edge-associated curve; and
    selecting peaks of the curve as the edge pixels.

9. The method of claim 8, wherein the determining comprises:
    sampling points with different values x from the curve; and
    formulating the curve as a function $$d(x; c, w, \sigma_d) = \frac{c}{\sqrt{2\pi(w^2 + \sigma_d^2)}} \exp\left(\frac{-(x - x_0)}{2(w^2 + \sigma_d^2)}\right);$$

determine the blurriness w according to function values of the sampled points,
    wherein c is an edge contrast, $x_0$ is an edge center, $\sigma_d$ is a parameter in a Gaussian filter which is chosen experientially.

10. The method of claim 9, wherein $\sigma_d$ is in a range from 1 to 3.

11. A method for editing an image having focused and defocused objects, comprising:
    detecting edge pixels in the image by at least one processor;
    estimating by the at least one processor a focus map of the image based on a blurriness of each of the edge pixels in the image to identify the focused objects and the defocused objects, the blurriness representing an edge width of said each of the edge pixels; and
    refocusing the defocused objects, or defocusing at least one of the focused objects and the defocused objects by the at least one processor.

12. The method of claim 11, wherein the detecting comprises:
    convolving the image with a derivative of a Gaussian filter; and
    determining peaks of a result of the convolving as the edge pixels.

13. The method of claim 11, wherein the estimating comprises:
   determining edge-associated parameters of each of the edge pixels;
   propagating the determined parameters to non-edge pixels adjacent to said each of the edge pixels; and
   estimating the focus map based on the parameters of the edge pixels and the non-edge pixels.

14. The method of claim 13, wherein the determined parameters comprise at least edge blurriness.

15. The method of claim 13, wherein the determined parameters comprise at least one of edge blurriness, an edge contrast, an edge center and an edge basis.

16. The method of claim 11, wherein the focus map comprises blurriness information of each pixel in the image.

17. The method of claim 13, wherein the determining comprises:
   sampling points with different values x from a curve determined by convolving the image with a derivative of a Gaussian filter; and
   formulating the curve as a function $$d(x; c, w, \sigma_d) = \frac{c}{\sqrt{2\pi(w^2 + \sigma_d^2)}} \exp\left(\frac{-(x-x_0)}{2(w^2 + \sigma_d^2)}\right);$$

determine parameters c, w, $x_0$ and b according to function values of the sampled points,
   wherein w is edge blurriness, c is an edge contrast, $x_0$ is an edge center, b is an edge basis, $\sigma_d$ is a parameter in a Gaussian filter which is chosen experientially.

18. The method of claim 17, wherein $\sigma_d$ is in a range from 1 to 3.

19. The method of claim 11, wherein the refocusing comprises:
   refocusing the defocused objects by a blind deconvolution.

20. The method of claim 11, wherein the refocusing comprises:
   determining a point spread function based on the focus map; and
   deconvolving the defocused objects with the point spread function so as to obtain the refocused image.

21. The method of claim 20, wherein the determining comprises:
   establishing at least one prior of the image based on the focus map; and
   determining the point spread function based on the established prior by using a maximum a posteriori (MAP).

22. The method of claim 21, wherein the established prior comprises a local sharp prior and/or a local smooth prior, wherein a sharpness of edge pixels in the refocused image is ensured by the local sharp prior, and a smoothness of non-edge pixels in the refocused image is ensured by the local smooth prior.

23. The method of claim 21, the established prior further comprises a global prior for ensuring a smoothness of the refocused image.

24. The method of claim 11, wherein the defocusing comprises:
   defocusing at least one of the focused objects and the defocused objects by Gaussian blurring.

25. An apparatus for editing an image having defocused objects, comprising:
   at least one processor communicably coupled to at least one nontransitory storage media containing processor executable instructions which, when executed by the at least one processor, cause the at least one processor to provide:
   a determining module that determines a blurriness of edge pixels in the image, the blurriness representing an edge width of said pixels;
   a propagating module that propagates the determined blurriness to non-edge pixels adjacent to each of the edge pixels so as to determine blurriness of the non-edge pixels;
   an estimating module that estimates a focus map based on the blurriness of the edge pixels and the non-edge pixels to identify the defocused objects; and
   a refocusing module that refocuses the defocused objects based on the focus map.

26. The apparatus of claim 25, wherein the refocusing module refocuses the defocused objects based on the focus map by a blind deconvolution.

27. The apparatus of claim 26, wherein the processor executable instructions cause the at least one processor, when providing the refocusing module, to further provide:
   a determining unit that determines a point spread function based on the focus map; and
   a deconvolving unit that deconvolves the defocused objects with the point spread function so as to obtain the refocused image.

28. The apparatus of claim 27, wherein at least one prior of the image is established based on the focus map, and the determining unit is configured to determine the point spread function based on the established prior by using a maximum a posteriori (MAP).

29. The apparatus of claim 28, wherein the established prior comprises a local sharp prior for ensuring a sharpness of edge pixels in the refocused image and/or a local smooth prior for ensuring a smoothness of non-edge pixels in the refocused image.

30. The apparatus of claim 29, wherein the established prior further comprises a global prior for ensuring a smoothness of the refocused image.

31. The apparatus of claim 25, wherein the focus map comprises the blurriness of each pixel in the image.

32. The apparatus of claim 25, further comprising processor executable instructions that cause the at least one processor to further provide:
   a convolving module to convolve the image with a derivative of a Gaussian filter to determine an edge-associated curve; and
   a selecting module to select peaks of the curve as the edge pixels.

33. The apparatus of claim 32, wherein the curve is formulating as a function $$d(x; c, w, \sigma_d) = \frac{c}{\sqrt{2\pi(w^2 + \sigma_d^2)}} \exp\left(\frac{-(x-x_0)}{2(w^2 + \sigma_d^2)}\right),$$

and wherein the processor executable instructions cause the at least one processor, when providing the determining module, to further provide:
   a sampling unit that samples points with different values x from the curve; and
   a determine unit that determines the blurriness w according to function values of the sampled points,
   wherein c is an edge contrast, $x_0$ is an edge center, $\sigma_d$ is a parameter in a Gaussian filter which is chosen experientially.

34. The apparatus of claim 33, wherein $\sigma_d$ is in a range from 1 to 3.

35. An apparatus for editing an image having focused and defocused objects, comprising:
- at least one processor communicably coupled to at least one nontransitory storage media containing processor executable instructions which, when executed by the at least one processor, cause the at least one processor to function as:
- a determining module that determines a blurriness of edge pixels in the image, the blurriness representing an edge width of said pixels;
- a propagating module that propagates the determined blurriness to non-edge pixels adjacent to each of the edge pixels so as to determine blurriness of the non-edge pixels;
- an estimating module that estimates a focus map based on the blurriness of the edge pixels and the non-edge pixels to identify the defocused objects; and
- a defocusing module that defocuses at least one of the focused objects and the defocused objects.

36. The apparatus of claim 35, wherein the processor executable instructions cause the at least one processor, when providing the defocusing module, to further defocus at least one of the focused objects and the defocused objects by Gaussian blurring.

* * * * *